Aug. 30, 1927.
E. V. POSTON
1,641,046
APPARATUS FOR AND METHOD OF SIMULTANEOUSLY
TEXTURING BOTH ENDS OF BRICK
Filed Dec. 16, 1925        2 Sheets-Sheet 1
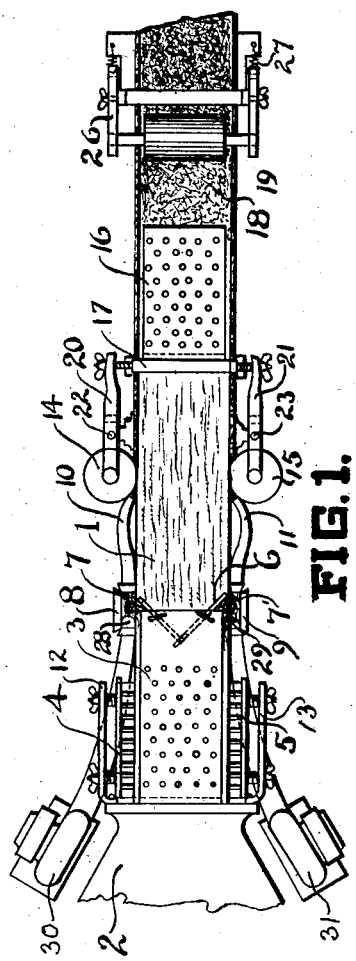
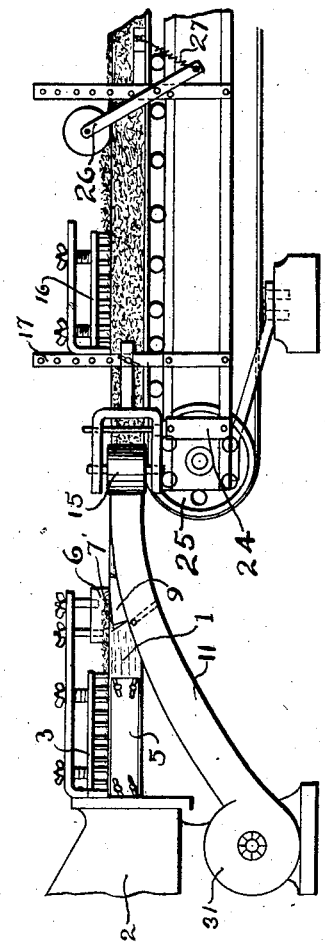
Witnesses:
1. Mabel McCall
2. Helen McCall
Emmitt V. Poston
INVENTOR.
BY A. B. McCall
ATTORNEYS.

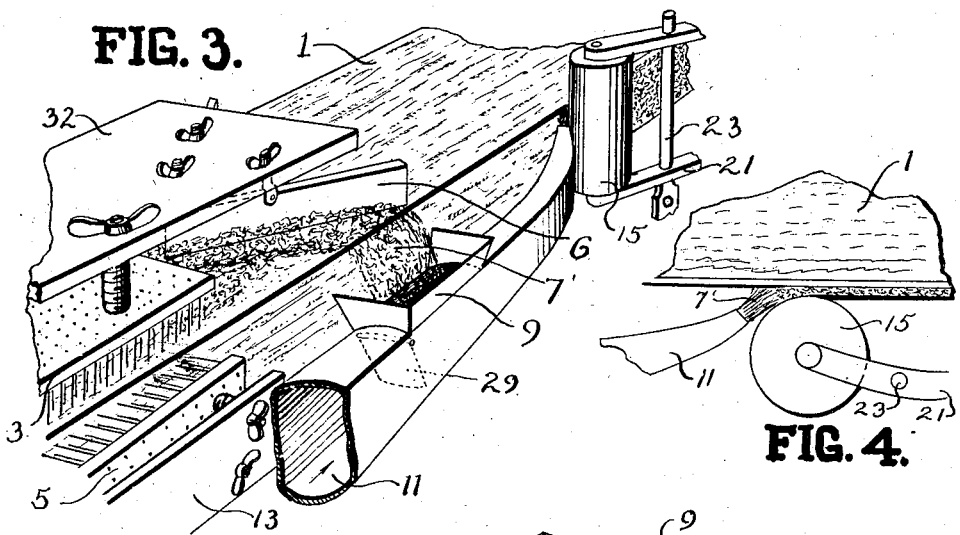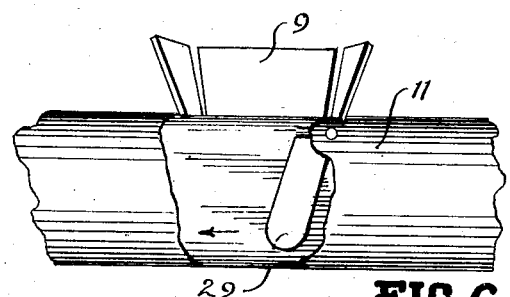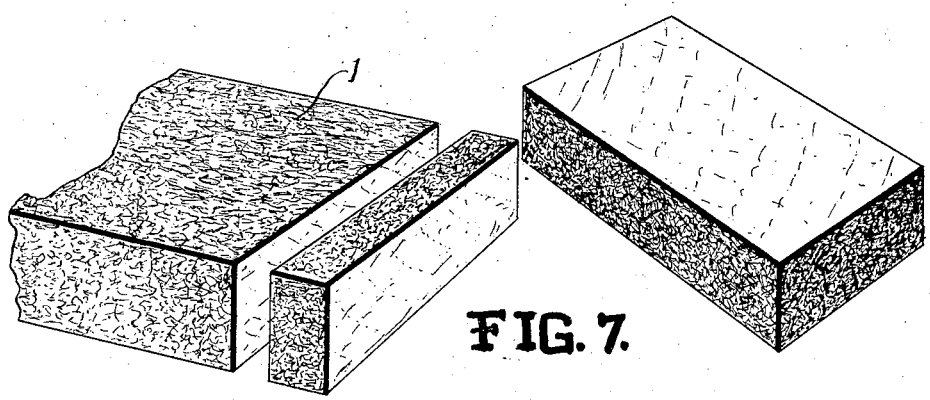

Patented Aug. 30, 1927.

1,641,046

UNITED STATES PATENT OFFICE.

EMMETT V. POSTON, OF SPRINGFIELD, ILLINOIS.

APPARATUS FOR AND METHOD OF SIMULTANEOUSLY TEXTURING BOTH ENDS OF BRICKS.

Application filed December 16, 1925. Serial No. 75,762.

This invention relates to devices and processes of texturing the ends of bricks by texturing the edges of the plastic clay column from which the bricks are cut and refers more particularly to a process of crummy texturing the ends of building brick while they are being similarly textured on a side surface.

Among the salient objects of this invention are to provide a device whereby in the process of manufacture of building bricks the edges of the plastic clay column may each be simultaneously textured while the top of the column is being textured with a surface of similar appearance.

A particular object of my invention is to provide not only a means of combing or scratching the surface of the plastic column but a means of saving the clay crumbs scratched up off of the top surface with the scratchers, and forcibly blowing them against and rolling them into the edge of the clay column in such a way as to make the surface of the edge of the plastic clay column look like the top face of the column does after it has been scratched and rolled to get a crummy texture.

I attain the objects of my invention by the device described in detail in the annexed specifications, recited in the claims and illustrated in the accompanying drawings, in which the numerals representing detailed parts of the device will be the same representing like parts in the several figures.

In the drawings:

Figure 1 is a plan view of the apparatus.

Figure 2 is one side elevation of the apparatus shown in Fig 1.

Figure 3 is a detail illustrating the scraper and the manner of its mounting used for scraping the plastic clay crumbs off of the top of the clay column after they have been scratched up from the surface where they drop into hoppers in a blower pipe from where they are blown and rolled into the edges of the clay column.

Figure 4 is a detail showing the manner in which the plastic clay crumbs are forcibly blown against and rolled into the sides of the plastic clay column to make them look like the top surface of the clay column after it has been scratched and rolled.

Figure 5 is a detail showing the method of mounting the side rollers which roll the plastic clay crumbs into the edges of the clay column.

Figure 6 is a detail cut-away showing the hopper in the blower pipe with its valve adapted to admit the air through the hopper without the loss of air out the hopper opening when the blower is in operation.

Figure 7 is a perspective of a brick as well as a section of the column from which the brick is cut showing in more complete detail the appearance of the surface texture on the face and ends of the brick made possible through my invention.

A careful study of the drawings will reveal that the particular purpose of the apparatus of my invention is to provide a successful, dependable means of texturing the edges or side of the plastic clay column with a crummy rough appearance the same as is now secured on the top surface of the plastic clay column by merely scratching the surface with a scratcher or wire comb after which the plastic crumbs of clay that are scratched out of the surface are immediately rolled in their roughened condition back into the surface, which results in leaving the top surface of the clay column in a rough spongy looking appearance in texture.

To those who are skilled in the art of brick manufacturing it will be seen that the method of crummy texturing the top surface of the plastic clay column by scratching and rolling as described is one that has been in use for some time in our own factory and perhaps in others and the details of the apparatus for accomplishing this result are not claimed herein as new but when it comes to similarly texturing the ends of brick or the sides of the plastic clay column before the bricks are cut therefrom a problem arises which heretofore has given much concern to manufacturers of bricks for instance:

In order that a brick should be successfully textured for building purposes it should have the same texture on one face and each end and to secure such a texture on three surfaces economically and conveniently the operations for all three surfaces should be handled simultaneously.

At the present time when the old method of crummy texturing the top surface of the plastic clay column is in operation the scratchers for the sides of the clay column operate at the same time the top surface is scratched but as these side scratchers scratch the crumbs out of the side surface of the clay column these crumbs will drop off between the wire scratchers and immediately after the wire scratcher has loosened them and be lost before a roller could possibly catch them to roll them back into the side surface and it is to remedy this condition that I have provided the device of my invention which in detail of structure and operation is as follows:

As the plastic clay column —1— emerges from the die —2— under pressure the top and side surfaces thereof immediately become scratched or combed on the top surface by scratcher —3— and on the side surfaces by scratchers —4— and —5— respectively and by referring to Fig. 1 it will readily be seen that the clay crumbs scratched off by scratchers —4— and —5— will at once drop off on the floor but that the crumbs scratched up by scratcher —3— being on the top surface will not be lost but will be available for use, in rolling them into the side surfaces to make the sides of the clay column look like the top surface does after it has been scratched and rolled.

To accomplish this result I provide a V shaped scraper —6— secured to scratcher —3— which is adapted to scrape crumbs —7— off of the top of the column in approximately even quantities off over each of the sides where said crumbs fall into hoppers —8— and —9— respectively of blower pipes —10— and —11— respectively. Blowers —12— and —13— positioned on opposite sides of the clay column and die when in operation are adapted to force a very strong draft of air through blower pipes —10— and —11— respectively and as they do so the crumbs which fall into hoppers —8— and —9— are automatically forced with decided speed out the respective ends of blower pipes —10— and —11— directly under the front of rollers —14— and —15— respectively just as these rollers normally come into firm contact with the sides of the clay column where it will thus be seen that the plastic clay crumbs taken from the top surface of the clay column are forcibly blown against and firmly rolled into the opposite sides of the clay column before they ever have a chance to drop to the floor. Numerals —30— and —31— indicate blowers actuated by motors.

It will be observed that if only one scratcher —3— were provided for the top surface of the clay column and then crumbs —7— were used for the side as has been described, that the process of texturing the top surface would not be accomplished completely; but I provide other scratchers and rollers to follow them further on down the column of clay which amply accomplish the process of crummy texturing the top surface of the clay column.

For instance as the clay column moves along out of die —2— it first passes under scratcher —3— and scraper —6— where the crumbs —7— that have been scratched up by scratcher —3— are raked off the top of the clay column —1— where they are disposed of as above described in the normal operation of the device of my invention; but after the clay column —1— has moved beyond the V shaped scraper —6— it is necessary to again scratch the top surface thereof in order to work up the plastic clay crumbs necessary for crummy texturing the top surface of the column.

It will be seen therefore, that a second scratcher —16— supported by a bracket —17— is provided for again scratching the top face of column —1— and when plastic clay crumbs are thus again worked out of the top surface of the column these crumbs —18— are firmly rolled into the top surface of the column again by roller —19— thus forming a crummy spongy appearing texture for this surface of the column, making a surface of pleasing appearance and one that will thus match the texture of the two sides of the clay column after the crummy texture has been made on these sides by the device of my invention.

After clay column —1— has thus slowly passed through the above mentioned surface texturing operations the column comes to rest so that a predetermined portion of the finished end of the column rests within a cutting jig wherein the normal operation of the cutter a plurality of block sections are simultaneously cut by wire cutters out of the plastic clay columns to be commonly known as building brick thereafter.

It will be seen that after this clay column is cut up into bricks that each brick will have one face and each end all of similar texture of a rough crummy spongy appearance, a result made possible economically, conveniently, and quickly in the process of manufacture in the normal operation of the device of my invention.

It will be seen that rollers —14— and —15— are pivotally mounted in a clevis —20— and —21— which is pivotally mounted on an upright rod —22— and —23—. This rod is supported by bearing —24— for belt pulley —25— and it will also be seen that roller —19— is supported on bracket —26— which holds said roller firmly in contact with the top surface of column —1— through the tensile strain of spring —27—.

In connection with hoppers —8— and —9— of the blower pipe —10— and —11— respectively a one way valve —28— and —29— is used as a sort of flap valve for controlling or directing the course of the air straight through the bottom of hopper —8— and —9— respectively. Numeral 32 indicates a bracketed metallic plate adapted to substantially support combing device —3— and the scraping device —6—. (See Fig. —3—.)

Having thus described the nature of my invention what I claim is:

1. A device for simultaneously texturing both ends of brick comprising in combination a surface comb for the top surface of the green clay column as the same is discharged from the forming die; a V shaped scraper operatively connected to said comb and adapted to scrape the clay crumbs off of the surface that are scratched up by said comb; a pair of oppositely disposed combs for scratching the edges of said clay column; a pair of oppositely disposed surface rollers spaced from said combs for the edge and a pair of blowers having blow pipes provided each with a hopper; said hoppers positioned slightly below the top surface of said clay column along the side thereof and registering with the outer terminals of said scraper; said hoppers each provided with a one way valve on the side next to the blower; said blow pipes each terminating under the forward arc of said corresponding rollers whereby the clay crumbs scratched up by said top surface comb on the clay column may be automatically scraped off the side, dropped into the hoppers of said blow pipes where from the action of the blower they are forced out the ends of said blow pipes and discharged forcibly against the edges of said clay column just as said side rollers catch them and presses them simultaneously on both edges firmly into said clay column.

2. In a device of the character described for texturing the ends of brick the combination with a set of surface combs and a V shaped scraper for the top surface of a pair of oppositely disposed blowers having blow pipes with open hoppers registering with the outer ends of said V shaped scraper; and a pair of oppositely disposed pressure rollers for the edges of said clay column; said blow pipes terminating against said corresponding opposite edges of said clay column and registering with the angle of contact between said rollers and said clay column whereby said clay crumbs combed from the top surface of said clay column may be automatically scraped off to the sides of said column, dropped into the hoppers of said blow pipes and blown forcibly out of the end of said pipes into the angle of contact between said side rollers and the corresponding edges of said clay column where they are automatically rolled firmly into said edges of the clay column thus producing a crummy textured surface upon the edges of the clay column where the same may be subsequently severed into building bricks.

3. A process of crummy texturing the sides of a plastic clay column consisting in mechanically scratching crumbs from the top surface of the column and mechanically blowing said crumbs against the side of the clay column where they are instantly rolled firmly into the sides of the column before the crumbs have a chance to drop.

In witness whereof I hereunto set my hand and seal this 28th day of November, 1925.

EMMETT V. POSTON.